United States Patent
Murfin et al.

(10) Patent No.: US 10,925,254 B2
(45) Date of Patent: Feb. 23, 2021

(54) ANIMAL TETHERING ASSEMBLY

(71) Applicants: William Murfin, Silverhill, AL (US); Susan Murfin, Silverhill, AL (US)

(72) Inventors: William Murfin, Silverhill, AL (US); Susan Murfin, Silverhill, AL (US)

( * ) Notice: Subject to any disclaimer, the term of this patent is extended or adjusted under 35 U.S.C. 154(b) by 487 days.

(21) Appl. No.: 16/005,780

(22) Filed: Jun. 12, 2018

(65) Prior Publication Data
US 2019/0373849 A1    Dec. 12, 2019

(51) Int. Cl.
*A01K 1/04* (2006.01)
*A01K 27/00* (2006.01)
*E04H 12/22* (2006.01)

(52) U.S. Cl.
CPC .............. *A01K 1/04* (2013.01); *A01K 27/003* (2013.01); *E04H 12/2215* (2013.01)

(58) Field of Classification Search
CPC ..... A01K 1/04; A01K 27/004; E04H 12/2215
USPC .... 119/769, 786, 780, 787, 61.57, 788, 791; 248/156, 530, 545, 87
See application file for complete search history.

(56) References Cited

U.S. PATENT DOCUMENTS

| | | | |
|---|---|---|---|
| 2,441,109 A * | 5/1948 | Carlson | E01F 9/631 403/86 |
| 2,525,890 A * | 10/1950 | Gage | A01K 1/04 119/787 |
| 2,790,419 A * | 4/1957 | Sullivan | A01K 1/04 119/786 |
| 2,981,230 A * | 4/1961 | Putnam | A01K 1/04 119/780 |
| 3,070,068 A * | 12/1962 | Chapman | A01K 1/04 119/786 |
| 3,309,048 A * | 3/1967 | Rousselet | B65H 75/366 248/87 |
| 3,964,441 A | 6/1976 | Wall | |
| 4,182,272 A | 1/1980 | Taff | |
| 4,546,730 A * | 10/1985 | Holland | A01K 5/0114 119/61.57 |
| 5,375,801 A * | 12/1994 | Porter | E04H 12/2215 248/156 |
| 5,526,774 A * | 6/1996 | Swindall, Jr. | A01K 1/04 119/787 |
| 5,875,805 A * | 3/1999 | Nichols | A01K 1/04 119/788 |
| 6,318,302 B1 * | 11/2001 | Bedient | A01K 1/04 119/786 |
| 6,820,573 B1 * | 11/2004 | McMullin | A01K 1/04 119/786 |
| D551,946 S * | 10/2007 | Hsu | D8/356 |
| 7,926,452 B1 | 4/2011 | Kim | |

(Continued)

*Primary Examiner* — Yvonne R Abbott-Lewis

(57) ABSTRACT

An animal tethering assembly for a pet includes a rod, which has a first end that is pointed. A handle is coupled to a second end of the rod and. A bar is coupled to and extends bidirectionally from the rod to define a lower segment of the rod. The bar is configured to position a foot of a user to apply a force to the rod to drive the lower segment of the rod into a substrate. A first terminus of a lead is coupled to the rod proximate to the bar, positioning a second terminus of the lead to couple to a collar that is coupled to an animal. A pair of hooks is coupled singly to the rod proximate to the first terminus of the lead and the second end of the rod. The hooks are positioned to loopedly position the lead to stow the lead.

12 Claims, 4 Drawing Sheets

(56) References Cited

U.S. PATENT DOCUMENTS

| | | | | |
|---|---|---|---|---|
| 7,984,698 B1 * | 7/2011 | Collins | ............ | A01K 1/04 |
| | | | | 119/780 |
| 8,230,648 B2 * | 7/2012 | Bulloch | ............ | B63B 21/40 |
| | | | | 52/157 |
| 8,307,789 B2 | 11/2012 | Stuerke | | |
| D725,844 S | 3/2015 | Church | | |
| 9,629,427 B1 * | 4/2017 | Alm | ............ | A45B 23/00 |
| D838,416 S * | 1/2019 | Richardson | ............ | D30/160 |
| 10,352,014 B1 * | 7/2019 | Baptiste | ............ | A01K 1/04 |
| 2002/0121580 A1 * | 9/2002 | Grady | ............ | B65F 1/141 |
| | | | | 248/146 |

* cited by examiner

ANIMAL TETHERING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to tethering assemblies and more particularly pertains to a new tethering assembly for a pet.

BRIEF SUMMARY OF THE INVENTION

An embodiment of the disclosure meets the needs presented above by generally comprising a rod, which has a first end that is pointed. A handle is coupled to a second end of the rod and. A bar is coupled to and extends bidirectionally from the rod to define a lower segment of the rod. The bar is configured to position a foot of a user to apply a force to the rod to drive the lower segment of the rod into a substrate. A first terminus of a lead is coupled to the rod proximate to the bar, positioning a second terminus of the lead to couple to a collar that is coupled to an animal. A pair of hooks is coupled singly to the rod proximate to the first terminus of the lead and the second end of the rod. The hooks are positioned to loopedly position the lead to stow the lead.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
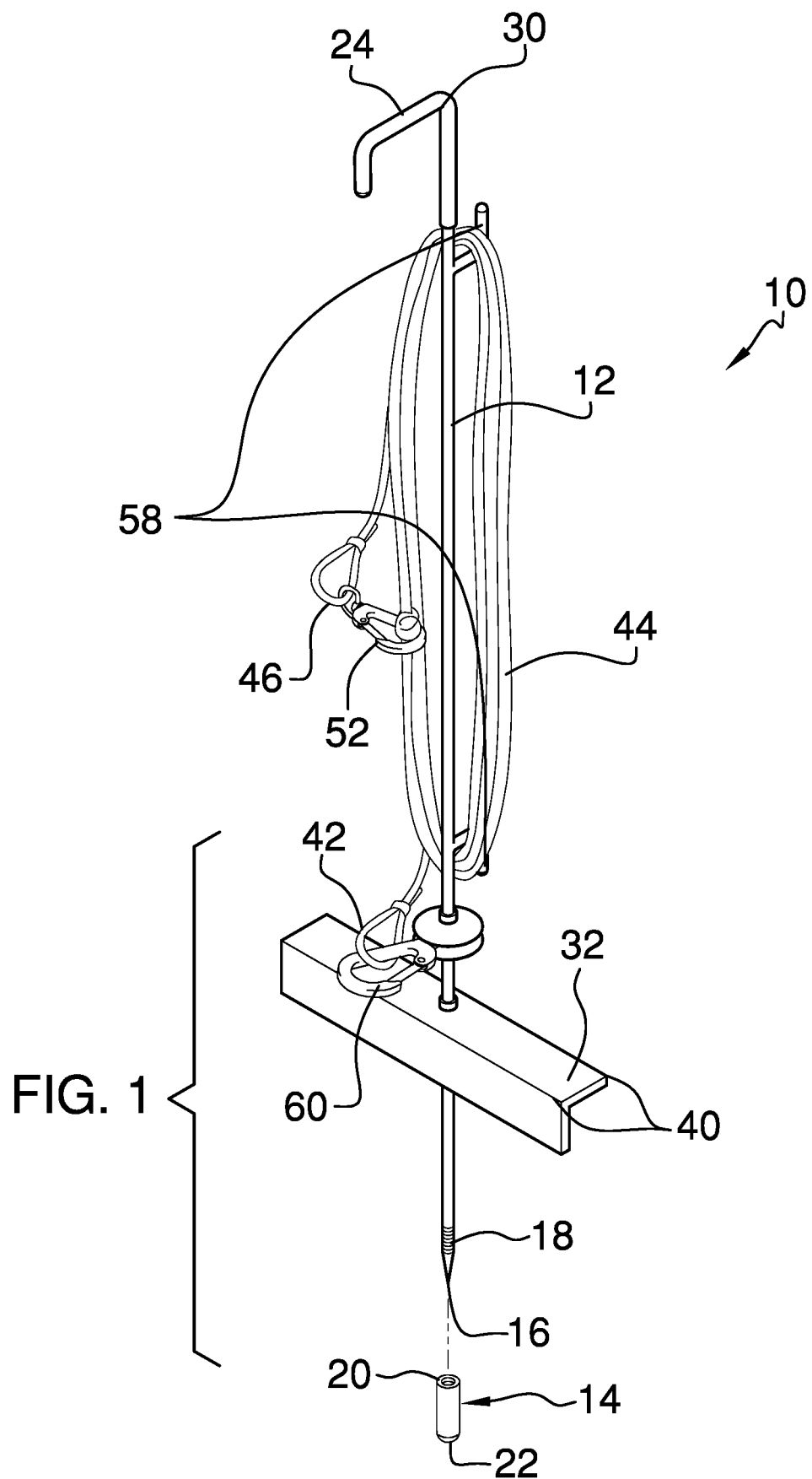
FIG. 1 is an isometric perspective view of an animal tethering assembly according to an embodiment of the disclosure.

With reference now to the drawings, and in particular to FIGS. 1 through 4 thereof, a new tethering assembly embodying the principles and concepts of an embodiment of the disclosure and generally designated by the reference numeral 10 will be described.

As best illustrated in FIGS. 1 through 4, the animal tethering assembly 10 generally comprises a rod 12 and a tube 14. The rod 12 has a first end 16 that is pointed. The rod 12 is circularly shaped when viewed longitudinally. The rod 12 comprises a threaded segment 18 proximate to the first end 16. The tube 14 has a top 20 that is open and a bottom 22 that is closed. The tube 14 is internally threaded so that the tube 14 is complementary the threaded segment 18 of the rod 12, as shown in FIG. 1. The tube 14 is positioned to selectively insert the first end 16 of the rod 12 and to threadedly couple to the threaded segment 18 to removably couple the tube 14 to the rod 12. The tube 14 covers the first end 16 of the rod 12 when the rod 12 is not in use.

Figure 2:
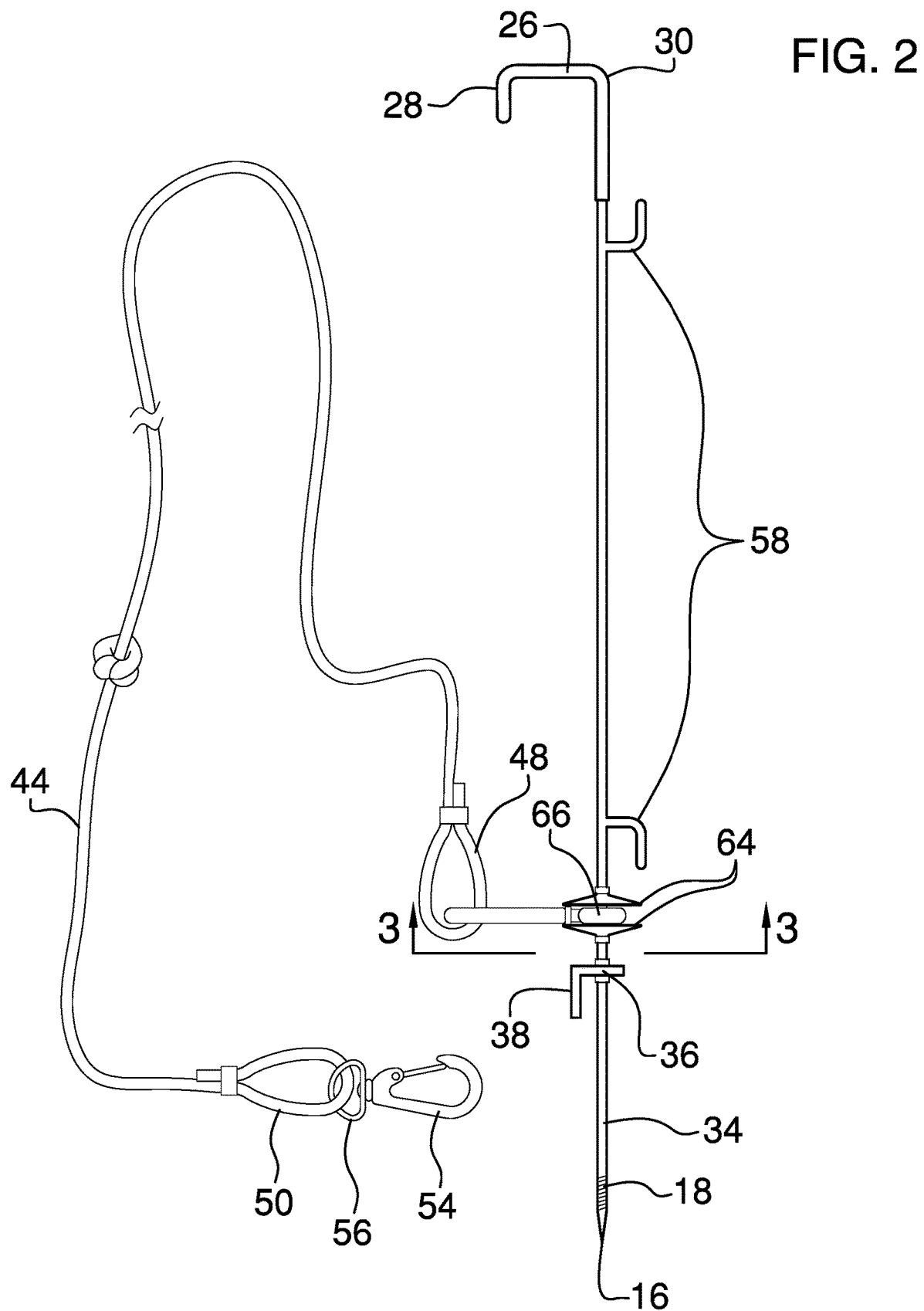
FIG. 2 is a front view of an embodiment of the disclosure.

A handle 24 is coupled to a second end 30 of the rod 12. The handle 24 is configured to be grasped in a hand of a user. The handle 24 comprises a first segment 26 and a second segment 28. The first segment 26 extends perpendicularly from the second end 30 of the rod 12. The second segment 28 extends perpendicularly from the first segment 26 distal from the rod 12 so that the second segment 28 is substantially parallel to the rod 12. The second segment 28 extends from the first segment 26 codirectionally with the rod 12, as shown in FIG. 2. The handle 24 can also be used to couple the rod 12 to an article, such as a fence, by positioning the article between the second segment 28 and the rod 12. The present invention also anticipates the handle 24 being curved so that the handle 24 and rod 12 together are cane shaped.

A bar 32 is coupled to and extends bidirectionally from the rod 12 to define a lower segment 34 of the rod 12. The bar 32 is configured to position a foot of the user to apply a force to the rod 12 to drive the lower segment 34 of the rod 12 into a substrate, such as a lawn. The bar 32 comprises a first section 36 and a second section 38. The first section 36 is coupled to the rod 12 so that the rod 12 is centrally positioned on and extends perpendicularly from the first section 36. The second section 38 extends perpendicularly from a respective opposing edge 40 of the first section 36 toward the first end 16 of the rod 12. The second section 38 is configured to insert into the substrate to stabilize the rod 12.

Figure 4:
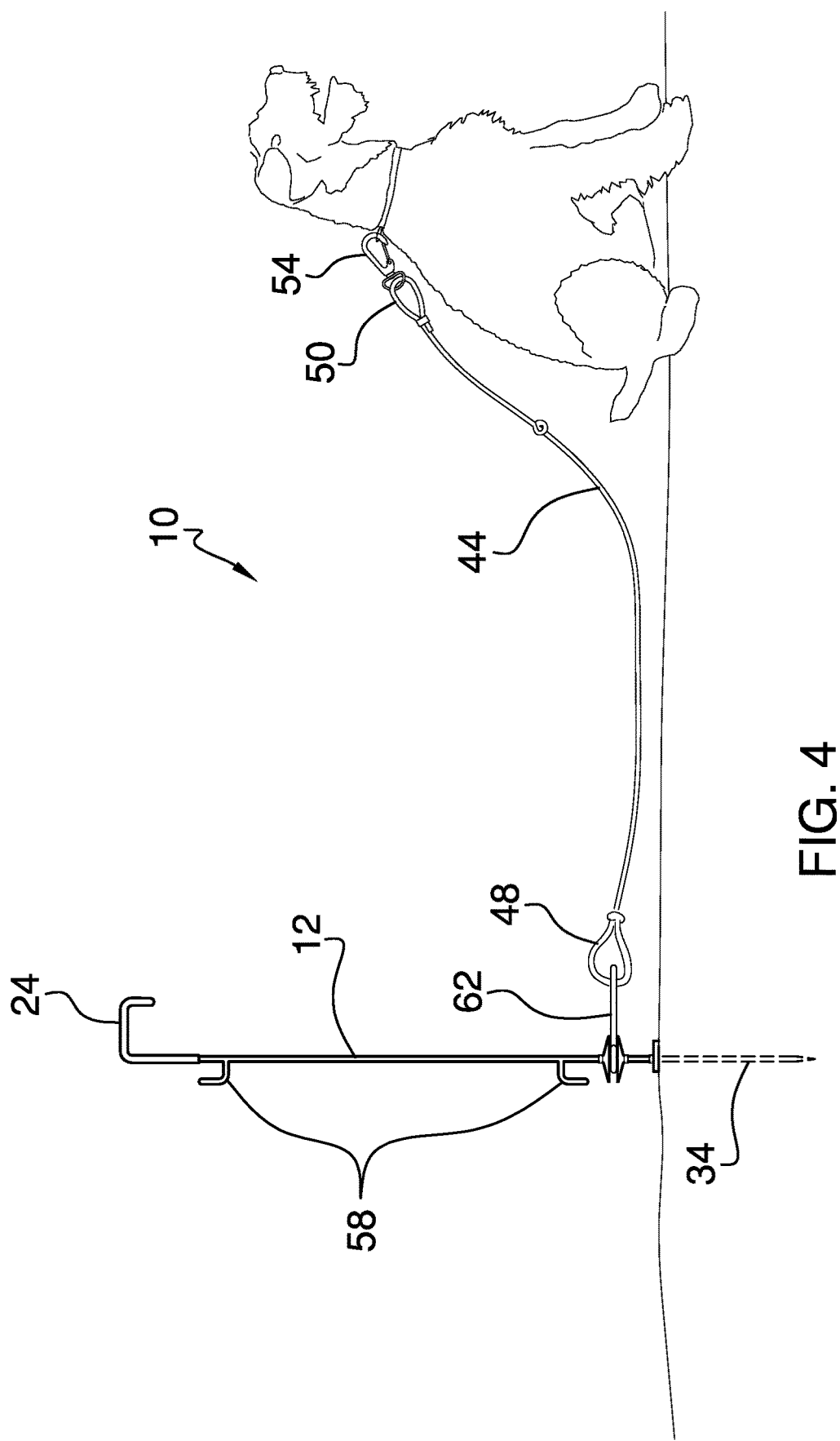
FIG. 4 is an in-use view of an embodiment of the disclosure.

A first terminus 42 of a lead 44 is coupled to the rod 12 proximate to the bar 32, positioning a second terminus 46 of the lead 44 to couple to a collar that is coupled to an animal, such as a dog, thereby tethering the animal to the rod 12, as shown in FIG. 4.

The lead 44 comprises a first loop 48, a second loop 50, and a distal coupler 52. The first loop 48 is coupled to the rod 12. The second loop 50 is positioned at the second terminus 46 of the lead 44. The distal coupler 52 is coupled to the second loop 50, positioning the distal coupler 52 to selectively couple to the collar that is coupled to the animal. The distal coupler 52 comprises a distal carabiner 54. The distal carabiner 54 is swivel-type. The lead 44 is coupled by the second loop 50 to a ring 56 of the distal carabiner 54, as shown in FIG. 2.

A pair of hooks 58 is coupled singly to the rod 12 proximate to the first terminus 42 of the lead 44 and the second end 30 of the rod 12. The hooks 58 are positioned to loopedly position the lead 44 to stow the lead 44. The hooks 58 are L-shaped. The hook 58 that is positioned proximate to the first terminus 42 of the lead 44 points toward the first end 16 of the rod 12, while the hook 58 that is positioned proximate to the second end 30 of the rod 12 points toward the second end 30 of the rod 12. This configuration of the hooks 58 prevents the lead 44 from sliding from the hooks 58, as shown in FIG. 1.

A proximal coupler 60 is positioned between the lead 44 and the rod 12. The proximal coupler 60 is positioned to selectively couple to the first loop 48 to removably couple the lead 44 to the rod 12. The proximal coupler 60 is rotationally coupled to the rod 12 so that the proximal coupler 60 is positioned to allow rotation of the lead 44 around the rod 12.

Figure 3:
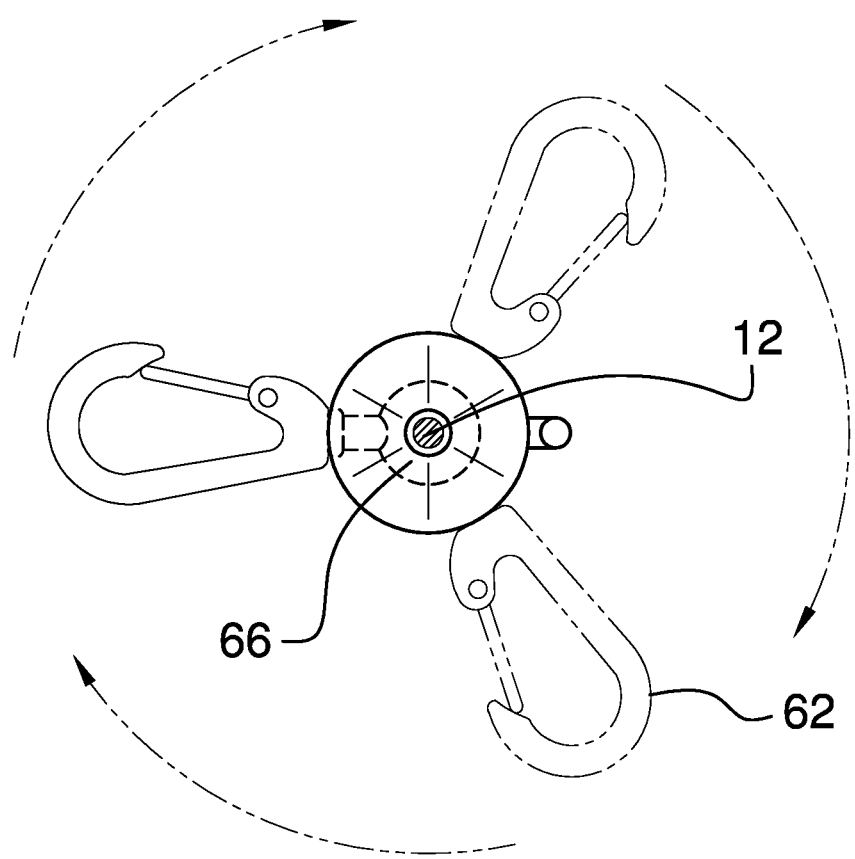
FIG. 3 is a bottom view of an embodiment of the disclosure.

The proximal coupler 60 comprises a proximal carabiner 62 and a pair of discs 64. The proximal carabiner 62 is swivel type. The rod 12 is positioned through a ring 66 of the proximal carabiner 62 to rotationally couple the proximal carabiner 62 to the rod 12, as shown in FIG. 3. The pair of discs 64 is fixedly coupled to the rod 12 so that the discs 64 bracket the ring 66 of the proximal carabiner 62, as shown in FIG. 2. The positioning of the discs 64 prevents longitudinal movement of the proximal carabiner 62 along the rod 12.

In use, the assembly 10 is carried to a desired location, such as a yard or a park, using the handle 24. The tube 14 is unscrewed from the threaded segment 18 of the rod 12 to expose the first end 16 of the rod 12. While grasping the handle 24 to stabilize the rod 12 substantially perpendicularly to the substrate, the user positions a foot on the bar 32 and applies a downward force to the bar 32 and rod 12, thus driving the lower segment 34 of the rod 12 into the substrate. The lead 44 is unwound from the hooks 58 and the distal carabiner 54 is used to couple the lead 44 to the collar of the animal. The proximal carabiner 62 allows the lead 44 to rotate around the rod 12 to prevent tangling.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:
1. An animal tethering assembly comprising:
a rod having a first end, the first end being pointed;
a handle coupled to a second end of the rod wherein the handle is configured for grasping in a hand of a user;
a bar coupled to and extending bidirectionally from the rod defining a lower segment of the rod wherein the bar is configured for positioning a foot of the user for applying a force to the rod for driving the lower segment of the rod into a substrate;
a lead having a first terminus coupled to the rod proximate to the bar positioning a second terminus of the lead for coupling to a collar coupled to an animal; and
a pair of hooks coupled singly to the rod proximate to the first terminus of the lead and the second end of the rod wherein the hooks are positioned for loopedly positioning the lead for stowing the lead.

2. The assembly of claim 1, further including the rod being circularly shaped when viewed longitudinally.

3. The assembly of claim 1, further including the handle comprising a first segment and a second segment, the first segment extending perpendicularly from the second end of the rod, the second segment extending perpendicularly from the first segment distal from the rod such that the second segment is substantially parallel to the rod, the second segment extending from the first segment codirectionally with the rod.

4. The assembly of claim 1, further including the bar comprising a first section and a second section, the first section being coupled to the rod such that the rod is centrally positioned on and extending perpendicularly from the first section, the second section extending perpendicularly from a respective opposing edge of the first section toward the first end of the rod wherein the second section is configured for inserting into the substrate for stabilizing the rod.

5. The assembly of claim 1, further including the lead comprising a first loop, a second loop, and a distal coupler, the first loop being coupled to the rod, the second loop being positioned at the second terminus of the lead, the distal coupler being coupled to the second loop positioning the distal coupler for selectively coupling to the collar coupled to the animal.

6. The assembly of claim 5, further including the distal coupler comprising a distal carabiner, the distal carabiner being swivel-type wherein the lead is coupled by the second loop to a ring of the distal carabiner.

7. The assembly of claim 5, further including a proximal coupler positioned between the lead and the rod wherein the proximal coupler is positioned for selectively coupling to the first loop for removably coupling the lead to the rod.

8. The assembly of claim 7, further including the proximal coupler being rotationally coupled to the rod wherein the proximal coupler is positioned for allowing rotation of the lead around the rod.

9. The assembly of claim 8, further including the proximal coupler comprising a proximal carabiner and a pair of discs, the proximal carabiner being swivel type wherein the rod is positioned through a ring of the proximal carabiner for rotationally coupling the proximal carabiner to the rod, the pair of discs being fixedly coupled to the rod such that the discs bracket the ring of the proximal carabiner positioning the discs for preventing longitudinal movement of the proximal carabiner along the rod.

10. The assembly of claim 1, further including the hooks being L-shaped, the hook positioned proximate to the first terminus of the lead pointing toward the first end of the rod, the hook positioned proximate to the second end of the rod pointing toward the second end of the rod such that the lead is prevented from sliding from the hooks.

11. The assembly of claim 1, further comprising:
the rod comprising a threaded segment proximate to the first end; and
a tube having a top and a bottom, the top being open, the bottom being closed, the tube being internally threaded such that the tube is complementary the threaded segment of the rod wherein the tube is positioned for selectively inserting the first end of the rod and for threadedly coupling to the threaded segment for removably coupling the tube to the rod for covering the first end of the rod.

12. An animal tethering assembly comprising:
a rod having a first end, the first end being pointed, the rod being circularly shaped when viewed longitudinally, the rod comprising a threaded segment proximate to the first end;
a handle coupled to a second end of the rod wherein the handle is configured for grasping in a hand of a user, the handle comprising a first segment and a second segment, the first segment extending perpendicularly from the second end of the rod, the second segment extending perpendicularly from the first segment distal from the rod such that the second segment is substantially parallel to the rod, the second segment extending from the first segment codirectionally with the rod;
a bar coupled to and extending bidirectionally from the rod defining a lower segment of the rod wherein the bar is configured for positioning a foot of the user for applying a force to the rod for driving the lower segment of the rod into a substrate, the bar comprising a first section and a second section, the first section being coupled to the rod such that the rod is centrally positioned on and extending perpendicularly from the first section, the second section extending perpendicularly from a respective opposing edge of the first section toward the first end of the rod wherein the second section is configured for inserting into the substrate for stabilizing the rod;
a lead having a first terminus coupled to the rod proximate to the bar positioning a second terminus of the lead for coupling to a collar coupled to an animal, the lead comprising a first loop, a second loop, and a distal coupler, the first loop being coupled to the rod, the second loop being positioned at the second terminus of the lead, the distal coupler being coupled to the second loop positioning the distal coupler for selectively coupling to the collar coupled to the animal, the distal coupler comprising a distal carabiner, the distal carabiner being swivel-type wherein the lead is coupled by the second loop to a ring of the distal carabiner;
a pair of hooks coupled singly to the rod proximate to the first terminus of the lead and the second end of the rod wherein the hooks are positioned for loopedly positioning the lead for stowing the lead, the hooks being L-shaped, the hook positioned proximate to the first terminus of the lead pointing toward the first end of the rod, the hook positioned proximate to the second end of the rod pointing toward the second end of the rod such that the lead is prevented from sliding from the hooks;
a proximal coupler positioned between the lead and the rod wherein the proximal coupler is positioned for selectively coupling to the first loop for removably coupling the lead to the rod, the proximal coupler being rotationally coupled to the rod wherein the proximal coupler is positioned for allowing rotation of the lead around the rod, the proximal coupler comprising a proximal carabiner and a pair of discs, the proximal carabiner being swivel type wherein the rod is positioned through a ring of the proximal carabiner for rotationally coupling the proximal carabiner to the rod, the pair of discs being fixedly coupled to the rod such that the discs bracket the ring of the proximal carabiner positioning the discs for preventing longitudinal movement of the proximal carabiner along the rod; and
a tube having a top and a bottom, the top being open, the bottom being closed, the tube being internally threaded such that the tube is complementary the threaded segment of the rod wherein the tube is positioned for selectively inserting the first end of the rod and for threadedly coupling to the threaded segment for removably coupling the tube to the rod for covering the first end of the rod.

* * * * *